United States Patent Office 2,933,374
Patented Apr. 19, 1960

2,933,374

PROCESS OF TREATING FLUOROSILANES TO FORM MONOSILANE

Newell C. Cook, Schenectady, and John K. Wolfe, Burnt Hills, N.Y., assignors to General Electric Company, a corporation of New York No Drawing. Application March 29, 1955
Serial No. 497,797

14 Claims. (Cl. 23—204)

This invention relates to a process for treating fluorosilanes and mixtures thereof. More particularly it relates to a process for the disproportionation of fluorosilanes.

Although silicon tetrafluoride is one of the most stable compounds known, it will react with atomic hydrogen to form fluorosilanes. Various methods of producing atomic hydrogen may be employed although the tendency of such atomic hydrogen to recombine rapidly into molecular hydrogen requires either that the silicon tetrafluoride be admixed with the hydrogen at the time the atomic hydrogen is formed or that the two be brought into contact as soon as possible following the formation of the atomic hydrogen.

The yield of fluorosilanes varies, as might be expected, with the reaction conditions. Generally the principal product is monohydrotrifluorosilane ($SiHF_3$) with a smaller amount of dihydrodifluorosilane ($SiH_2F_2$) together with traces of trihydromonofluorosilane ($SiH_3F$) and silane itself ($SiH_4$).

For example, in a suitable apparatus hydrogen was passed at the rate of 6 cc./min. through a D.-C. arc (10.5 amps., 80 volts) and into a stream of silicon tetrafluoride ($SiF_4$) flowing at the rate of 30 cc./min. for 2½ hours. The arc column extended radially from the end of a 0.100" tungsten electrode with thoriated tip to the inner edge of an annular molybedenum electrode of such size as to provide an arc of 0.160". The arc was rotated by a magnetic field at a rate of the order of 17,000 r.p.s. The product was passed through a Dry Ice trap ($-78°$ C.) to remove HF and then collected in a liquid nitrogen trap. Analysis by infrared spectrometry indicated 10 to 20 percent of the silicon tetrafluoride had been converted to fluorosilanes. Use of glass in the reaction apparatus improved the yields but the flow rates of the reactants had little effect on the yields if the hydrogen was in excess by a 5:1 volume ratio. Similar results are obtained by mixing hydrogen at the rate of 600 cc./min. with silicon tetrafluoride at the rate of 30 cc./min. and passing the mixture through the same rotating arc apparatus (12 amps., 65 volts).

Fluorosilanes may also be prepared in good yields by passing mixtures of hydrogen and silicon tetrafluoride over a tungsten filament preferably heated to temperatures of the order of 2400 to 2900° C. Particularly at the higher filament temperatures substantial amounts of materials containing Si—Si bonds are obtained.

Mixtures of fluorosilanes such as are obtained in the above described example have proved extremely difficult to separate. More particularly, they have been found to be inseparable by low temperature distillation techniques since the large amount of silicon tetrafluoride present formed a solid at the boiling point of the mixture and invariably caused serious plugs in the distillation column.

It is an object of this invention to provide a method for treating such mixtures to produce highly valuable products therefrom which are readily recovered.

A further object of the invention is to provide a method for producing silane, $SiH_4$, from mixtures of fluorosilanes.

Still another object is to provide a method for treating silanes in which the sole product evolved is silane itself.

Still another object of the invention is to provide a method of treating mixtures of fluorosilanes by which a simultaneous reaction and separation of constituents of the mixture is accomplished.

Still another object of the invention is to provide a process for treating fluorosilanes in which the entire mixture is converted into silane and silicon tetrafluoride, each of which is recovered separately.

Another object is to provide a process for treating a hydrofluorosilane to convert it into silane and silicon tetrafluoride.

Other objects will appear hereinafter.

It has now been found that the foregoing objects are accomplished by contacting a hydrofluorosilane with sodium fluoride. The hydrofluorosilane upon contact with the sodium fluoride undergoes a reaction, one of the products of which is silane and the other of which is disodium silicon hexafluoride, $Na_2SiF_6$. When the latter compound is heated at elevated temperature the sodium fluoride catalyst is reactivated and silicon tetrafluoride is formed and may be recovered. That sodium fluoride would react as it does is very surprising in view of the fact that closely related fluorides such as potassium fluoride, lithium fluoride, barium fluoride, etc., do not cause the disproportionation reaction.

The processes are applicable to mixtures of hydrofluorosilanes with other hydrofluorosilanes and/or with silicon tetrafluoride and/or silane itself. Mixtures containing a number of hydrofluorosilanes together with silicon tetrafluoride and at least traces of silane itself such as are produced by the above described arc treatment of mixtures of hydrogen and silicon tetrafluoride readily undergo the described reaction to yield silane itself as the sole gaseous product evolved, although the sodium fluoride catalyst is at the same time converted to disodium silicon hexafluoride as above described.

The invention will be better understood by a consideration of the following examples which are intended as illustrations only, however, and are thus not intended to be construed as limitations.

Example 1

5000 grams of porous sodium fluoride pellets, prepared by heating $NaF \cdot HF$ pellets about ⅜" in diameter and ⅜" long to 400° C. first for 12 hours in a nitrogen stream and then for 6 hours in a vacuum of <1 mm. of mercury pressure, were placed in a large horizontally extending nickel tube (36" long by 4" in diameter). This quantity of pellets completely filled the tube. 5 liters of a mixture of fluorosilanes prepared as described in the above example by passing a mixture of hydrogen and silicon tetrafluoride through an electric arc were passed over the sodium fluoride at room temperature over a period of 30 minutes. A slight heating effect, i.e., rise in temperature, of the reaction tube, was observed. The gaseous product was found to be pure $SiH_4$ by infrared spectra examination and mass spectra pattern.

Example 2

70 grams of porous sodium fluoride pellets (⅛" x ⅛", cylindrically shaped) prepared as described in Example 1 were placed in a small vertically extending nickel tube 1" in diameter and 12" long. 6 liters of a mixture of fluorosilanes similar to that employed in Example 1 was passed over the sodium fluoride in the tube at room temperature over a period of thirty minutes. A slight heating effect (rise in temperature to 50° C.) and change of composition was observed. The tube was then heated to 125° C. and the material was repassed therethrough at the rate of 20–30 cc. per minute. During the repassing of the material through the tube the temperature rose very sharply (270°–300° C.), giving a sharply defined hot zone which progressed gradually through the tube during the reaction. The product was pure silane and appeared to be produced quantitatively. The catalyst was reactivated by heating it to 500–650° C. for two hours to decompose the Na$_2$SiF$_6$ formed during the disproportionation reaction. The decomposition produced sodium fluoride pellets which could be reused to disproportionate fluorosilanes and, as the other product, silicon tetrafluoride which may be recovered.

The hydrofluorosilanes to which the invention applies include SiHF$_3$, SiH$_2$F$_2$, SiH$_3$F as well as the higher hydrofluorosilanes containing Si—Si bonds. As indicated by the above examples, the disproportionation reaction of the hydrofluorosilane occurs simply upon contact with the sodium fluoride catalyst.

Although the invention is not intended to be limited to any particular theory, it is believed that the reactions occurring may be represented as follows:

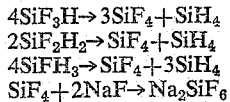

$$4SiF_3H \rightarrow 3SiF_4 + SiH_4$$
$$2SiF_2H_2 \rightarrow SiF_4 + SiH_4$$
$$4SiFH_3 \rightarrow SiF_4 + 3SiH_4$$
$$SiF_4 + 2NaF \rightarrow Na_2SiF_6$$

The reaction in which the catalyst is reactivated is believed to occur as follows:

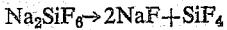

$$Na_2SiF_6 \rightarrow 2NaF + SiF_4$$

Since the disproportionation occurs at room temperature as well as at elevated temperature, the invention is not limited to the use of any particular reaction temperature or reaction initiating temperature. On the other hand, since the reaction takes place more rapidly at elevated temperatures as illustrated in the above examples, the use of such temperatures is preferred. The precise temperature to which the catalyst is preferably heated will vary depending upon the flow rate of the hydrofluorosilanes over the catalyst. As the flow rate increases the preferred temperature to which to heat the catalyst also increases. Using the tube and catalyst described in Example 2 above and practical flow rates of 20–30 cc. per minute of the mixture of fluorosilanes employed in that example, the preferred temperature to which to heat the catalyst is from about 200° C. to about 250° C. It will also be apparent that in a system suitably designed to control the dissipation of the exothermic heat of the reaction continued heating of the catalyst is unnecessary to maintain the desired rate of reaction although it may be desirable to heat the catalyst initially in order to establish the reaction at the desired rate.

Although the silicon tetrafluoride is absorbed by a reaction with the sodium fluoride catalyst, neither silane itself nor the hydrofluorosilanes are absorbed by the catalyst. Furthermore, as indicated in the above examples, the catalyst can be reactivated by heating it to decompose the disodium silicon hexafluoride formed by the absorption of the silicon tetrafluoride. The decomposition of this compound occurs at red heat and it is found that it can be decomposed by heating to a temperature in the range from about 500° C. to about 650° C. to reactivate the sodium fluoride and drive off silicon tetrafluoride which has been absorbed.

It is highly preferable to remove substantially all HF from the NaF·HF pellets in order to avoid an undesirable side reaction. It has been found that if any HF is allowed to remain in the catalyst, hydrogen is produced along with the silane which is the sole product when no HF is present. The undesired side reaction is believed to be of the following type:

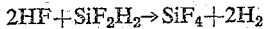

$$2HF + SiF_2H_2 \rightarrow SiF_4 + 2H_2$$

The HF may all be removed from the pellets by heating them at a temperature in the range from about 400° C. to about 600° C. under vacuum, the exact temperature depending on the length of heating and the vacuum used. Suitable heating time and vacuum for use in connection with a temperature of 400° C. is indicated in the above examples. That all the HF has been driven off the catalyst can be determined by observing whether a vacuum of 10–20 microns over the heated catalyst remains static with no pumping. If substantially all the HF has not been driven off the pressure will rise gradually under these conditions and hydrogen will be produced during the disproportionation by the type of reaction set forth above.

The contact between the sodium fluoride and the hydrofluorosilane may be brought about in any desired type of equipment. In like manner the silane which is produced may be recovered in any desired manner as will be apparent to those skilled in the art.

This process is particularly advantageous in that it produces silane in relatively pure form in which it is readily usable as an intermediate in the synthesis of silicones. The process has the further advantage that it provides a method for converting the mixture of hydrofluorosilanes obtainable from a waste product, silicon tetrafluoride, into a product which is useful. The process has the further advantage that the constituents of the raw material other than those forming the silane which is evolved, are absorbed on the sodium fluoride catalyst which permits a concentration of these materials in convenient form for regeneration and recycle. As pointed out, the catalyst is readily regenerated and at the same time the silicon tetrafluoride which has been absorbed by the catalyst is readily recovered. Other advantages will be readily apparent to those skilled in the art.

It is apparent that many widely different embodiments of this invention may be made without departing from the spirit and scope thereof and, therefore, it is not intended to be limited except as indicated in the appended claims.

We claim:

1. The process of disproportionating a hydrofluorosilane to form silane which comprises contacting the hydrofluorosilane with sodium fluoride as a disproportionating catalyst.

2. The process of disproportionating a mixture of hydrofluorosilanes to form silane which comprises contacting the mixture of hydrofluorosilanes with sodium fluoride as a disproportionating catalyst.

3. The process of disproportionating a mixture comprising hydrofluorosilanes and silicon tetrafluoride to form silane which comprises contacting the mixture with sodium fluoride as a disproportionating catalyst.

4. The process of disproportionating a hydrofluorosilane to form silane which comprises contacting the hydrofluorosilane with sodium fluoride as a disproportionating catalyst at an elevated temperature.

5. The process of disproportionating a hydrofluorosilane to form silane which comprises heating sodium fluoride to a temperature in the range from about 200° C. to about 250° C. and contacting the hydrofluorosilane with the heated sodium fluoride as a disproportionating catalyst.

6. The process of disproportionating a hydrofluorosilane to form silane which comprises contacting the hydrofluorosilane with sodium fluoride which is free of hydrogen fluoride, said sodium fluoride being a disproportionating catalyst.

7. The process of disproportionating a hydrofluorosilane to form silane which comprises contacting the hydrofluorosilane with porous sodium fluoride pellets which are free of hydrogen fluoride, said sodium fluoride being a disproportionating catalyst.

8. The process of disproportionating a hydrofluorosilane to form silane which comprises contacting the hydrofluorosilane with porous sodium fluoride pellets which are free of hydrogen fluoride and are obtained by heating NaF·HF pellets at a temperature of about 400° C. to about 600° C. to drive off all the hydrogen fluoride, said sodium fluoride being a disproportionating catalyst.

9. The process of disproportionating a hydrofluorosilane to form silane which comprises heating sodium fluoride which is free of hydrogen fluoride to a temperature in the range from about 200° C. to about 250° C. and contacting the hydrofluorosilane with the heated sodium fluoride as a disproportionating catalyst.

10. The process of disproportionating a hydrofluorosilane to form silane which comprises contacting the hydrofluorosilane with sodium fluoride, as a disproportionating catalyst, and then heating the $Na_2SiF_6$ formed from the sodium fluoride to a temperature in the range from about 500° C. to about 650° C. to drive off silicon tetrafluoride and regenerate the sodium fluoride.

11. A process as described in claim 1, in which the silane in a substantially pure state is removed from the reaction zone and recovered.

12. A process as described in claim 9, in which the silane in a substantially pure state is removed from the reaction zone and recovered.

13. The process which comprises contacting a mixture containing silicon tetrafluoride and a hydrofluorosilane with sodium fluoride, as a disproportionating catalyst, to convert substantially the entire mixture into silicon tetrafluoride and silane and recovering the silicon tetrafluoride and the silane separately, each in a substantially pure state, by collecting the gaseous silane evolved and by heating the $Na_2SiF_6$ so formed to decompose it into sodium fluoride and silicon tetrafluoride and collecting the gaseous silicon tetrafluoride evolved.

14. The process of disproportionating a hydrofluorosilane to form silane which comprises contacting the hydrofluorosilane with a catalyst consisting essentially of sodium fluoride.

References Cited in the file of this patent

UNITED STATES PATENTS

| 1,816,523 | Gluud et al. | July 28, 1931 |
| 2,426,557 | Long et al. | Aug. 26, 1947 |
| 2,732,281 | Bailey et al. | Jan. 24, 1956 |

OTHER REFERENCES

Friend: "A Textbook of Inorganic Chemistry," 1917, vol. V, pp. 193–194.

Hurd: "Chemistry of the Hydrides," 1952, p. 110.

"Chemical Abstracts," vol. 31, col. 5705 (1937).

Kirk et al.: "Encyclopaedia of Chemical Technology," 1951, vol. 6, pp. 729, 731.